United States Patent Office 3,829,475
Patented Aug. 13, 1974

3,829,475
2-(CARBOXYPHENYL)ETHYL AND 2-(CARBOXY-PHENYL)VINYL CYCLOPROPYL CARBINOLS
Joseph C. Collins, East Greenbush, N.Y., assignor to Sterling Drug Inc., New York, N.Y.
No Drawing. Filed June 22, 1972, Ser. No. 265,333
Int. Cl. C07c 65/02
U.S. Cl. 260—520   3 Claims

ABSTRACT OF THE DISCLOSURE

Aryl substituted diketones and keto-esters, useful as antiviral agents and insecticides, are prepared by reacting an arylalkyl or arylalkenyl iodide with a metal salt of the appropriate diketone or keto-ester.

This invention relates to aryl substituted diketones and keto-esters, to the preparation thereof and to certain novel intermediates.

The compounds of the invention are of the structural formula

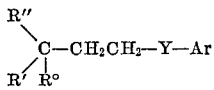

wherein Y is selected from the group consisting of:

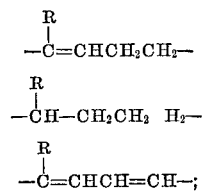

R' is lower-alkanoyl of 2 to 6 carbon atoms;
R" is lower-alkanoyl of 2 to 6 carbon atoms or carbo-lower-alkoxy of 2 to 6 carbon atoms;
R° is hydrogen, lower-alkyl of 1 to 4 carbon atoms or chloro;
R is hydrogen or lower-alkyl of 1 to 4 carbon atoms; and
Ar is phenyl or phenyl substituted by 3,4-methylenedioxy or one or two monovalent substituents selected from the group consisting of lower-alkyl of 1 to 4 carbon atoms, lower-alkoxy of 1 to 4 carbon atoms, carbo-lower-alkoxy of 2 to 4 carbon atoms, halogen, trifluoromethyl and trifluoromethoxy.

The carbon chains of R, R', R", R° and Ar substituents can be straight or branched, although primary or secondary alkyl moieties are perferred.

When two monovalent substituents are present on the phenyl ring of Ar, they can be the same or different.

The compounds of the invention are prepared as described in the following reaction sequences.

REACTION SEQUENCE A

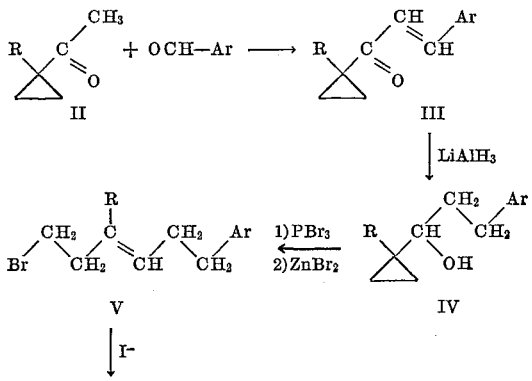

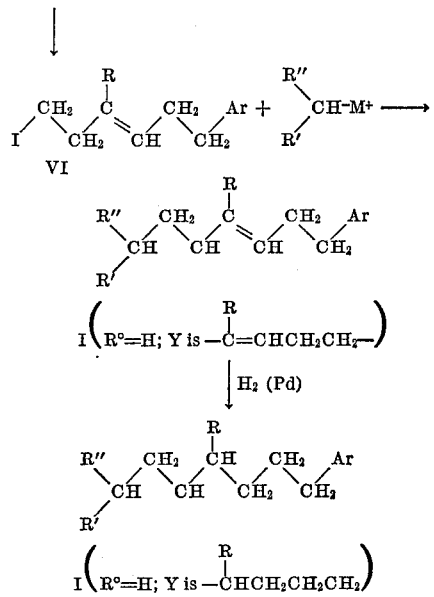

In the foregoing Reaction Sequence A, a 1-R-1-acetyl-cyclopropane of formula II, where R has the meaning given hereinabove, is treated with an aldehyde ArCHO in the presence of a base to give the arylvinyl 1-R-cyclopropyl ketone of formula III. The latter, when treated with lithium aluminum hydride is reduced at both the carbonyl group and the olefinic linkage to give an arylethyl 1-R-cyclopropyl carbinol of formula IV. This carbinol is then treated with phosphorus tribromide in the presence of a metal bromide such as lithium bromide to replace the hydroxy group by bromine, which product is then treated with zinc bromide to effect ring opening to form an arylalkenyl bromide of formula V. The latter with a metallic iodide is converted to the corresponding iodide of formula VI. The iodide then is treated with the alkali metal enolate salt of a diketone or keto-ester of formula (R')(R")CH−M+, where R' and R" have the meanings given hereinabove and M+ is an alkali metal, preferably lithium. The reaction takes place in an inert solvent under anhydrous conditions and produces a compound of formula I where R° is hydrogen and Y is —C(R)=CHCH$_2$CH$_2$—. Catalytic hydrogenation of the latter, for example with palladium, platinum or rhodium catalyst, reduces the olefinic linking to afford a compound of formula I where R° is hydrogen and Y is —CH(R)CH$_2$CH$_2$CH$_2$—.

Alternatively, hydrogenation of the double bond may be performed earlier in the synthesis, upon the unsaturated bromide of formula V. Hydrogenation of the latter in the presence of palladium or platinum oxide catalyst produces a saturated bromide of formula

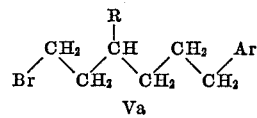
Va

The latter in turn is converted to the corresponding iodide:

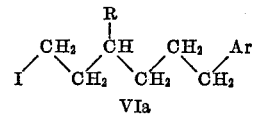
VIa which then is treated with the meallo derivative (R')(R")CH−M+ to give I (R° is H; Y is —CH(R)CH$_2$CH$_2$CH$_2$).

It has also been found that saturated bromides of formula Va can be caused to react directly with the metallo derivative (R′)(R″)CH⁻M⁺, without intermediate conversion to the iodides VIa, to form final products of formula I. The iodide reaction takes place at temperatures of 20–60° C., whereas the bromide reaction requires a higher temperature, about 100–150° C.

REACTION SEQUENCE B

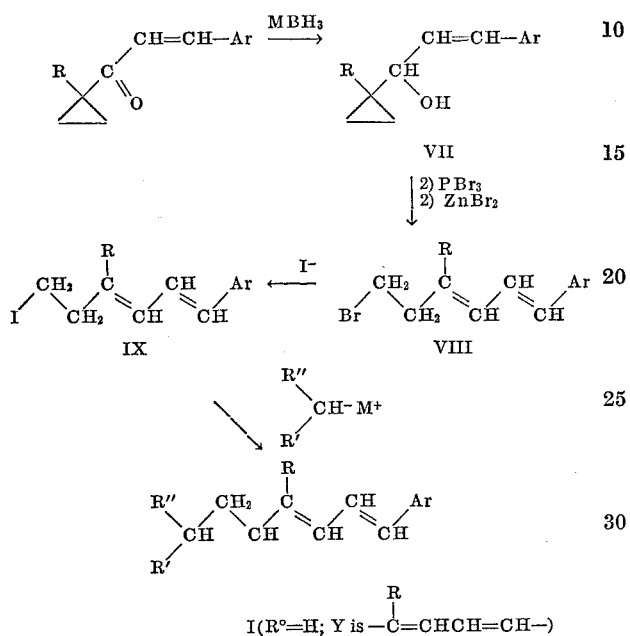

In Reaction Sequence B the arylvinyl 1-R-cyclopropyl ketone of formula III is treated with an alkali metal borohydride, preferably sodium borohydride to reduce the carbonyl group but not the olefinic linkage and provide an arylvinyl 1-R-cyclopropyl carbinol of formula VII. By procedure analogous to those shown in Reaction Sequence A, the carbinol of formula VII is treated with phosphorus tribromide in the presence of a metal bromide and then with zinc bromide to give a diunsaturated aralkyl bromide of formula VIII. The latter is then converted to the corresponding iodide (IX), which reacts with the alkali metal enolate salt of a diketone or ketoester to afford a compound of formula I where R° is hydrogen and Y is —C(R)=CHCH=CH—. If desired, the latter can be catalytically hydrogenated to produce a compound of formula I where Y is

—CH(R)CH₂CH₂CH₂—.

The compounds of formula I when R° is chloro can be prepared by treating the corresponding compounds of formula I when R° is hydrogen with a chlorinating agent. An appropriate chlorinating agent is one which introduces a chlorine atom in a position alpha to a carbonyl group. Examples of appropriate chlorinating agents are t-butyl hypochlorite, cupric chloride and sulfuryl chloride.

The compounds of formula I where R° is lower-alkyl can be prepared by treating the corresponding compounds of formula I where R° is hydrogen with a lower-alkyl iodide in the presence of a strong base under anhydrous conditions. The strong base can be an alkali metal alkoxide, hydride or amide, or a strong organic amine such as 1,5-diazabicyclo[5.4.0]undec-5-ene.

Biological evaluation of the compounds of the invention has shown that they possess antiviral activity. They have been found to be effective in vitro against a variety of viruses, including rhino-2, equine rhino, para-influenza and respiratory syncitial virus at minimal growth inhibitory concentrations (mic) ranging from about 0.5 to about 50 micrograms per milliliter. The mic values were determined by standard serial dilution procedures. Further evaluation on tissue culture and by administration to rhesus monkeys demonstrated in vivo antiviral activity.

The compounds of the invention have also been found to possess pesticidal activity. They showed juvenile hormone-like activity when tested under simulated field conditions in a greenhouse against one or more of the following pest species: yellow mealworm pupae, dock beetle larvae, cabbage looper larvae, yellow fever mosquito larvae and Rhodnius prolixus nymph.

The structures of the compounds of the invention were established by the modes of synthesis, by elementary analysis, and by infrared and nuclear magnetic resonance spectral determinations.

The following examples will further illustrate the invention.

PREPARATION OF INTERMEDIATES (A) 2-Arylvinyl cyclopropyl ketones (III)

(A1) 2-(3,4-Methylenedioxyphenyl)vinyl 1-ethylcyclopropyl ketone [III; Ar is 3,4-methylenedioxyphenyl, R is C₂H₅].—A mixture of 33.6 g. (0.3 mole) of 1-ethylcyclopropyl methyl ketone and 45 g. (0.3 mole) of piperonal in 21 ml. of ethanol was stirred at room temperature, and 21 ml. of 20% aqueous sodium hydroxide was added dropwise over a period of 30–45 minutes. The mixture was warmed at 40–60° C. for three hours with stirring. The solution was then cooled to 0–10° C., 0.2 ml. of glacial acetic acid added, and the mixture was extracted with ether. The ether extracts were concentrated, and the residue dissolved in 200 ml. of 95% ethanol, which solution when cooled caused separation of a solid product. The latter was recrystallized from 150 ml. of methanol to give 39 g. of 2-(3,4-methylenedioxyphenyl)vinyl 1-ethylcyclopropyl ketone, m.p. 62–64° C.

(A2) 2-(3,4-Methylenedioxyphenyl)vinyl cyclopropyl ketone [III; Ar is 3,4-methylenedioxyphenyl, R is H] was prepared from 8.4 g. of cyclopropyl methyl ketone and 15 g. of piperonal according to the procedure described above in Preparation (A1), affording 21.5 g., m.p. 85–87° C. when recrystallized from ethanol.

(A3) 2-(3,4-Methylenedioxyphenyl)vinyl 1-methylcyclopropyl ketone [III; Ar is 3,4-methylenedioxyphenyl, R is CH₃] was prepared from 25.6 g. of 1-methylcyclopropyl methyl ketone and 39.3 g. of piperonal according to the procedure described above in Preparation (A1), affording 29.5 g. of crystalline product.

(A4) 2-(3,4-Dimethoxyphenyl)vinyl 1-ethylcyclopropyl ketone [III; Ar is 3,4-(CH₃O)₂C₆H₃, R is C₂H₅] was prepared from 22.4 g. of 1-ethylcyclopropyl methyl ketone and 33.2 g. of veratraldehyde according to the procedure described above in Preparation (A1), affording 20.3 g., b.p. 156–158° C. (0.02 mm.).

(A5) 2-(4-Methoxyphenyl)vinyl cyclopropyl ketone [III; Ar is 4-CH₃OC₆H₄, R is H] was prepared from 84.1 g. of cyclopropyl methyl ketone and 136 g. of p-methoxybenzaldehyde according to the procedure described above in Preparation (A1), affording 173.5 g., m.p. 70–72° C. when recrystallized from ethanol.

(A6) 2-Phenylvinyl cyclopropyl ketone [III; Ar is C₆H₅, R is H] was prepared from 13.5 g. of cyclopropyl methyl ketone and 17.1 g. of benzaldehyde according to the procedure described above in Preparation (A1), affording 23.0 g., m.p. 58–60° C. when recrystallized from absolute ethanol.

(A7) 2-(4-Chlorophenyl)vinyl cyclopropyl ketone [III; Ar is 4-ClC₆H₄, R is H] was prepared from 25.2 g. of cyclopropyl methyl ketone and 42 g. of p-chlorobenzaldehyde according to the procedure described above in Preparation (A1), affording 31 g., m.p. 63–65° C. when recrystallized from ethanol.

(A8) 2-(p-Tolyl)vinyl cyclopropyl ketone [III; Ar is 4-CH₃C₆H₄, R is H] was prepared from 84.1 g. of cyclopropyl methyl ketone in 120 g. of p-tolualdehyde according to the procedure described above in Preparation (A1), affording 158.7 g., colorless plates, m.p. 78–80° C. when recrystallized from ethanol.

(A9) 2-(4-Carboxyphenyl)vinyl 1-ethylcyclopropyl ketone [III; Ar is 4-$HO_2CC_6H_4$, R is $C_2H_5$] was prepared from 67.2 g. of 1-ethylcyclopropyl methyl ketone and 90 g. of p-carboxybenzaldehyde according to the procedure described above in Preparation (A1), affording 40 g., m.p. 183.5–184.5° C. when recrystallized from acetonitrile and then repeatedly from isopropyl alcohol.

By following the procedure of Preparation (A1) above, 1-isopropylcyclopropyl methyl ketone or 1-butylcyclopropyl methyl ketone can be caused to react with piperonal to give 2-(3,4-methylenedioxyphenyl)vinyl 1-isopropylcyclopropyl ketone [III; Ar is 3,4-methylenedioxyphenyl, R is $(CH_3)_2CH$], or 2-(3,4-methylenedioxyphenyl)vinyl 1-butylcyclopropyl ketone [III; Ar is 3,4-methylenedioxyphenyl, R is $CH_3CH_2CH_2CH_2$], respectively.

By following the procedure of Preparation (A1) above, cyclopropyl methyl ketone can be caused to react with 3,4 - dichlorobenzaldehyde, 2,4 - dichlorobenzaldehyde, 4-bromobenzaldehyde, 4 - fluorobenzaldehyde, 4 - trifluoromethoxybenzaldehyde or 4-trifluoromethylbenzaldehyde to give, respectively, 2-(3,4-dichlorophenyl)vinyl cyclopropyl ketone [III; Ar is 3,4-$Cl_2C_6H_3$, R is H], 2-(2,4-dichlorophenyl)vinyl cyclopropyl ketone [III; Ar is 2,4-$Cl_2C_6H_3$, R is H], 2-(4-bromophenyl)vinyl cyclopropyl ketone [III; Ar is 4-$BrC_6H_4$, R is H], 2-(4-fluorophenyl)vinyl cyclopropyl ketone [III; Ar is 4-$FC_6H_4$, R is H], 2-(4-trifluoromethoxyphenyl)vinyl cyclopropyl ketone [III; Ar is 4-$F_3COC_6H_4$, R is H], or 2-(4-trifluoromethylphenyl)vinyl cyclopropyl ketone [III; Ar is 4-$F_3CC_6H_4$, R is H].

(B) 2-Arylethyl cyclopropyl carbinols (IV) and 2-arylvinyl cyclopropyl carbinols (VII)

(B1) 2-(3,4-Methylenedioxyphenyl)ethyl 1-ethylcyclopropyl carbinol [IV; Ar is 3,4-methylenedioxyphenyl, R is $C_2H_5$].—A suspension of 15 g. of lithium aluminum hydride in about 500 ml. of tetrahydrofuran was heated at reflux while a solution of 60 g. of 2-(3,4-methylenedioxyphenyl)vinyl 1-ethylcyclopropyl ketone (Preparation (A1)) in 150 ml. of tetrahydrofuran was added dropwise over a period of 2–3 hours. The reaction mixture was heated at reflux for two hours, cooled, and then water was added very cautiously. Excess anhydrous sodium sulfate was added, the mixture filtered, and the filter cake washed several times with chloroform. The combined filtrate and washings were evaporated to dryness to give 53 g. of an oil consisting of 2-(3,4-methylenedioxyphenyl)ethyl 1-ethylcyclopropyl carbinol.

(B2) 2-(3,4-Methylenedioxyphenyl)ethyl cyclopropyl carbinol [IV; Ar is 3,4-methylenedioxyphenyl, R is H] was prepared from 18.4 g. of 2-(3,4-methylenedioxyphenyl)vinyl cyclopropyl ketone (Preparation (A2)) and 3.1 g. of lithium aluminum hydride according to the procedure described above in Preparation (B1), affording 11.5 g., b.p. 116–122° C. (0.005 mm.), m.p. 64–65° C. when recrystallized from ether.

(B3) 2-(3,4-Methylenedioxyphenyl)ethyl 1-methylcyclopropyl carbinol [IV; Ar is 3,4-methylenedioxyphenyl, R is $CH_3$] was prepared from 23.4 g. of 2-(3,4-methylenedioxyphenyl)vinyl 1-methylcyclopropyl ketone (Preparation (A3)) and 3.88 g. of lithium aluminum hydride according to the procedure described above in Preparation (B1), affording 18.8 g., b.p. 120–130° C. (0.003 mm.).

(B4) 2-(3,4-Dimethoxyphenyl)ethyl 1-ethylcyclopropyl carbinol [IV; Ar is 3,4-$(CH_3O)_2C_6H_3$, R is $C_2H_5$] was prepared from 15 g. of 2-(3,4-dimethoxyphenyl)vinyl 1-ethylcyclopropyl ketone (Preparation (A4)) and 2.2 g. of lithium aluminum hydride according to the procedure described above in Preparation (B1), affording 10 g., b.p. 148–150° C. (0.01 mm.).

(B5) 2-(4-Methoxyphenyl)ethyl cyclopropyl carbinol [IV; Ar is 4-$CH_3OC_6H_4$, R is H] was prepared from 50 g. of 2-(4-methoxyphenyl)-vinyl cyclopropyl ketone (Preparation (A5)) and 9.7 g. of lithium aluminum hydride according to the procedure described in Preparation (B1), affording 42 g., b.p. 116–117° C. (0.05 mm.).

(B6) 2-Phenylethyl cyclopropyl carbinol [IV; Ar is $C_6H_5$, R is H] was prepared from 23 g. of 2-phenylvinyl cyclopropyl ketone (Preparation (A6)) and 5.22 g. of lithium aluminum hydride according to the procedure described above in Preparation (B1)), affording 18.5 g., b.p. 89–90° C. (0.02 mm.).

(B7) 2-(4-Chlorophenyl)ethyl cyclopropyl carbinol [IV; Ar is 4-$ClC_6H_4$, R is H] was prepared from 31 g. of 2-(4-chlorophenyl)-vinyl cyclopropyl ketone (Preparation (A7)) and 5.87 g. of lithium aluminum hydride according to the procedure described above in Preparation (B1), affording 23.8 g., b.p. 105–106° C. (0.1 mm.).

(B8) 2-(p-Tolyl)ethyl cyclopropyl carbinol [IV; Ar is 4-$CH_3C_6H_4$, R is H] was prepared from 158 g. of 2-(p-tolyl)vinyl cyclopropyl ketone (Preparation (A8)) and 33.2 g. of lithium aluminum hydride according to the procedure described above in Preparation (B1), affording 137 g., b.p. 97–98° C. (0.13 mm.).

(B9) 2-(4-Carboxyphenyl)vinyl 1 - ethylcyclopropyl carbinol [VII; Ar is 4-$HO_2CC_6H_4$, R is $C_2H_5$].—To a stirred suspension of 34.0 g. of 2-(4-carboxyphenyl)vinyl 1-ethylcyclopropyl ketone (Preparation (A9)) in 500 ml. of ice water was slowly added 11 g. of sodium borohydride over a one hour period. The mixture was stirred for about sixteen hours and then cautiously acidified with ice-cold concentrated hydrochloric acid. The solid material was collected by filtration and dissolved in ether. The ether solution was dried over anhydrous magnesium sulfate and concentrated to give 33.2 g. of 2-(4-carboxyphenyl)vinyl 1-ethylcyclopropyl carbinol, m.p. 130–131° C. when recrystallized from toluene.

(B10) 2-(4-Carboxyphenyl)ethyl 1 - ethylcyclopropyl carbinol [IV; Ar is 4-$HO_2CC_6H_4$, R is $C_2H_5$].—A solution of 29 g. of 2-(4-carboxyphenyl)vinyl 1-ethylcyclopropyl carbinol (Preparation (B9)) in 200 ml. of ethanol was hydrogenated in the presence of 1 g. of palladium-on-carbon catalyst. There was thus obtained 28 g. of 2-(4-carboxyphenyl)ethyl 1 - ethylcyclopropyl carbinol, colorless crystals, m.p. 116–117.5° C.

(B11) 2 - (3,4 - Methylenedioxyphenyl)vinyl 1-ethylcyclopropyl carbinol [VII; Ar is 3,4-methylenedioxyphenyl, R is $C_2H_5$].—To a cold solution of 5 g. of 2-(3,4-methylenedioxyphenyl)vinyl 1-ethylcyclopropyl ketone (Preparation (A1)) in 50 ml. of methanol was added in portions 1.56 g. of sodium borohydride. The mixture was stirred at room temperature for two hours, then diluted with water and extracted with ether. The ether extracts were dried and concentrated to give 3.6 g. of 2-(3,4-methylenedioxyphenyl)vinyl 1 - ethylcyclopropyl carbinol as a colorless oil.

By replacing the 2-(3,4-methylenedioxyphenyl)vinyl 1-ethylcyclopropyl ketone in Preparation (B1) above by a molar equivalent amount of 2-(3,4-methylenedioxyphenyl)vinyl 1-isopropylcyclopropyl ketone, 2-(3,4-methylenedioxyphenyl)vinyl 1-butylcyclopropyl ketone, 2-(3,4-dichlorophenyl)vinyl cyclopropyl ketone, 2-(2,4-dichlorophenyl)vinyl cyclopropyl ketone, 2-(2,4-bromophenyl)vinyl cyclopropyl ketone, 2-(4-fluorophenyl)vinyl cyclopropyl ketone, 2-(4-trifluoromethoxyphenyl)vinyl cyclopropyl ketone or 2-(4-trifluoromethylphenyl)vinyl cyclopropyl ketone there can be obtained, respectively, 2-(3,4-methylenedioxyphenyl) - ethyl 1 - isopropylcyclopropyl carbinol [IV; Ar is 3,4-methylenedioxyphenyl, R is $(CH_3)_2CH$], 2-(3,4-methylenedioxyphenyl)ethyl 1-butylcyclopropyl carbinol [IV; Ar is 3,4-methylenedioxyphenyl, R is $CH_3CH_2CH_2CH_2$], 2-(3,4-dichlorophenyl)ethyl cyclopropyl carbinol [IV; Ar is 3,4-$Cl_2C_6H_3$, R is H], 2-(2,4-dichlorophenyl) - ethyl cyclopropyl carbinol [IV; Ar is 2,4-$Cl_2C_6H_3$, R is H], 2-(4-bromophenyl)ethyl cyclopropyl carbinol [IV; Ar is 4-$BrC_6H_4$, R is H], 2-(4-fluorophenyl)ethyl cyclopropyl carbinol [IV; Ar is 4-FC$_6$H$_4$, R is H], 2-(4-trifluoromethoxyphenyl)ethyl cyclopropyl carbinol [IV; Ar is 4-F$_3$COC$_6$H$_4$, R is H], or 2-(4-trifluoromethylphenyl)ethyl cyclopropyl carbinol [IV; Ar is 4-F$_3$CC$_6$H$_4$, R is H].

(C) Arylalkenyl bromides (V, VIII) and arylalkyl bromides (Va)

(C1) 3-Ethyl-6-(3,4-methylenedioxyphenyl-3 - hexenyl bromide [V; Ar is 3,4 - methylenedioxyphenyl, R is C$_2$H$_5$].—To a solution of 26.4 g. (0.106 mole) of 2-(3,4-methylenedioxyphenyl)ethyl 1-ethylcyclopropyl carbinol in 250 ml. of ether, cooled to —30° C. under nitrogen, was added 18 ml. of collidine. Lithium bromide (26 g., 0.3 mole) was then added, the mixture cooled to —50° C. and 25 g. (0.09 mole) of phosphorus tribromide was added dropwise. The reaction mixture was stirred at —50° C. for ten minutes, allowed to warm to 0° C. over a three hour period and stirred at 0° C. for three hours. Collidine (30 ml.) was added, followed by 10 ml. of water. The reaction mixture was partitioned between water and ether, the ether layer washed with water and sodium chloride solution, and dried over anhydrous magnesium sulfate. The ether solution was concentrated to give an oily product used directly in the following reaction.

The latter product was dissolved in about 200 ml. of anhydrous ether and added in a fine stream to a stirred mixture of 27 g. of zinc bromide in 200 ml. of ether held at —30 to —35° C. The mixture was stirred, then allowed to warm to 0° C. during two hours, held there for thirty minutes, and then allowed to warm to room temperature over a three hour period and stirred for two hours longer. The reaction mixture was partitioned between ether and aqueous sodium chloride. The ether layer was washed three times with 500 ml. of water, then with sodium chloride solution, dried over anhydrous magnesium sulfate and concentrated to remove the solvent. The residue was redissolved in ether, washed with dilute aqueous sodium bicarbonate and with sodium chloride solution, and evaporated to give 23 g. of 3-ethyl-6-(3,4-methylenedioxyphenyl)-3-hexenyl bromide as a straw-colored oil.

(C2) 6-(3,4-Methylenedioxyphenyl)-3-hexenyl bromide [V; Ar is 3,4-methylenedioxyphenyl, R is H] was prepared from 11.5 g. of 2-(3,4-methylenedioxyphenyl)ethyl cyclopropyl carbinol (Preparation (B2)), 12 g. of phosphorus tribromide, 10 g. of lithium bromide and 12.7 g. of zinc bromide according to the procedure given above in Preparation (C1), affording 12.5 g. of product as an oil.

(C3) 3-Methyl - 6 - (3,4 - methylenedioxyphenyl)-3-hexenyl bromide [V; Ar is 3,4-methylenedioxyphenyl, R in CH$_3$] was prepared from 17.6 g. of 2-(3,4-methylenedioxyphenyl)ethyl 1-methylcyclopropyl carbinol (Preparation (B3)), 20.3 g. of phosphorus tribromide, 18.5 g. of lithium bromide and 21 g. of zinc bromide according to the procedure given above in Preparation (C1), affording 19 g. of product as an oil.

(C4) 3-Ethyl-6-(3,4 - dimethoxyphenyl) - 3 - hexenyl bromide [V; Ar is 3,4-(CH$_3$O)$_2$C$_6$H$_3$, R is C$_2$H$_5$] was prepared from 16 g. of 2-(3,4-dimethoxyphenyl)ethyl 1-ethylcyclopropyl carbinol (Preparation (B4)), 16.8 g. of phosphorus tribromide, 16.8 g. of lithium bromide and 17.6 g. of zinc bromide according to the produre given above in Preparation (C1). The product was used directly in the succeeding step (Preparation (D4)) without isolation.

(C5) 6-(4-Methoxyphenyl)-3-hexenyl bromide [V; Ar is 4-CH$_3$OC$_6$H$_4$, R is H] was prepared from 38.2 g. of 2-(4-methoxyphenyl)ethyl cyclopropyl carbinol (Preparation (B5)), 42.5 g. of phosphorus tribromide, 35 g. of lithium bromide and 40 g. of zinc bromide according to the procedure given above in Preparation (C1), affording 48 g. of product as an oil.

(C6) 6-Phenyl-3-hexenyl bromide [V; Ar is C$_6$H$_5$, R is H] was prepared from 16.5 g. of 2-phenylethyl cyclopropyl carbinol (Preparation (B6)), 21.5 g. of phosphorus tribromide, 17.65 g. of lithium bromide and 20.7 g. of zinc bromide according to the procedure given above in Preparation (C1), affording 21 g. of product as a pale yellow oil.

(C7) 6-(4-Chlorophenyl)-3-hexenyl bromide [V; Ar is 4-ClC$_6$H$_4$, R is H] was prepared from 21 g. of 2-(4-chlorophenyl)ethyl cyclopropyl carbinol (Preparation (B7)), 23 g. of phosphorus tribromide, 18.85 g. of lithium bromide and 22.5 g. of zinc bromide according to the procedure given above in Preparation (C1), affording 25.5 g. of product as an oil.

(C8) 6-(p-Tolyl) - 3 - hexenyl bromide [V; Ar is 4-CH$_3$C$_6$H$_4$, R is H] can be prepared from 2-(p-tolyl)ethyl cyclopropyl carbinol (Preparation (B8)), phosphorus tribromide, lithium bromide and zinc bromide according to the procedure given above in Preparation (C1).

(C9) 3-Ethyl -6-(4-carbomethoxyphenyl) - 3 - hexenyl bromide [V; Ar is 4-CH$_3$O$_2$CC$_6$H$_4$, R is C$_2$H$_5$].—A mixture of 21.3 g. of 2-(4-carboxyphenyl)vinyl 1-ethylcyclopropyl carbinol (Preparation (B9)) and 500 ml. of methanol saturated with hydrogen chloride at 0° C. was stirred for one hour at 0° C. and then allowed to come to room temperature with stirring until the solution was complete. The reaction mixture was concentrated to dryness, the residue taken up in chloroform and washed with water and sodium bicarbonate solution, dried over anhydrous magnesium sulfate and concentrated to give 24.4 g. of a light yellow oil. The latter product was dissolved in a small quantity of ether and added to a solution of 700 g. of zinc bromide in 4 liters of anhydrous ether. The reaction mixture was stirred for twenty hours, then washed with water, dried over anhydrous magnesium sulfate and the solvent evaporated, affording 17.5 g. of 3-ethyl-6-(4-carbomethoxyphenyl)-3-hexenyl bromide as a light yellow oil.

(C10) 3-Ethyl - 6 - (3,4 - methylenedioxyphenyl)-3,5-hexadienyl bromide [VIII; Ar is 3,4-methylenedioxyphenyl, R is C$_2$H$_5$] was prepared from 3.6 g. of 2-(3,4-methylenedioxyphenyl)vinyl 1-ethylcyclopropyl carbinol (Preparation (B11)), 3.5 g. of phosphorus tribromide, 4.5 g. of lithium bromide and 3.5 g. of zinc bromide according to the procedure given above in Preparation (C1), affording 2 g. of product as an oil.

(C11) 6-(4-Methoxyphenyl)hexyl bromide [Va; Ar is 4-CH$_3$OC$_6$H$_4$, R is H].—A mixture of 18.6 g. of 6-(4-methoxyphenyl)-3-hexenyl bromide (Preparation (C5)) and 0.21 g. of platinum oxide catalyst in 200 ml. of isopropyl alcohol was hydrogenated until 1 mole equivalent of hydrogen had been absorbed. The product was isolated and distilled to give 12.8 g. of 6-(4-methoxyphenyl)-hexyl bromide, b.p. 126–128° C. (0.04 mm.).

(C12) 6-Phenylhexyl bromide [Va; Ar is C$_6$H$_5$, R is H] was prepared by hydrogenation of 21 g. of 6-phenyl-3-hexenyl bromide (Preparation (C6)) according to the procedure described above in Preparation (C11), affording 16 g., b.p. 86–87° C. (0.02 mm.).

(C13) 6-(4-Chlorophenyl)hexyl bromide [Va; Ar is 4-ClC$_6$H$_4$, R is H] was prepared by hydrogenation of 25.2 g. of 6-(4-chlorophenyl)-3-hexenyl bromide (Preparation (C7)) according to the procedure described in Preparation (C11)), affording 17 g., b.p. 110–111° C. (0.02 mm.).

(C14) 6 - (p - Tolyl)hexyl bromide [Va; Ar is 4-CH$_3$C$_6$H$_4$, R is H] can be prepared by hydrogenation of 6-(p-tolyl)-3-hexenyl bromide according to the procedure described above in Preparation (C11).

By replacing the 2-(3,4-methylenedioxyphenyl)ethyl 1-ethylcyclopropyl carbinol in Preparation (C1) by a molar equivalent amount of 2-(3,4-methylenedioxyphenyl)ethyl 1-isopropylcyclopropyl carbinol, 2 - (3,4-methylenedioxyphenyl)ethyl 1-butylcyclopropyl carbinol, 2-(3,4-dichlorophenyl)ethyl cyclopropyl carbinol, 2 - (2,4 - dichlorophenyl)ethyl cyclopropyl carbinol, 2-(4-bromophenyl) ethyl cyclopropyl carbinol, 2-(4-fluorophenyl)ethyl cyclopropyl carbinol, 2-(4-trifluoromethoxyphenyl)ethyl cyclopropyl carbinol or 2 - (4 - trifluoromethylphenyl)ethyl cyclopropyl carbinol there can be obtained, respectively, 3-isopropyl-6-(3,4-methylenedioxyphenyl) - 3 - hexenyl bromide [V; Ar is 3,4 - methylenedioxyphenyl, R is $(CH_3)_2CH$], 3-butyl - 6 - (3,4-methylenedioxyphenyl)-3-hexenyl bromide [V; Ar is 3,4-methylenedioxyphenyl, R is $CH_3CH_2CH_2CH_2$], 6-(3,4 - dichlorophenyl)-3-hexenyl bromide [V; Ar is 3,4-$Cl_2C_6H_3$, R is H], 6-(2,4-dichlorophenyl)-3-hexenyl bromide [V; Ar is 2,4-$Cl_2C_6H_3$, R is H], 6-(4-bromophenyl) - 3 - hexenyl bromide [V; Ar is 4-$BrC_6H_4$, R is H], 6-(4-fluorophenyl)-3-hexenyl bromide [V; Ar is 4-$FC_6H_4$, R is H], 6-(4-trifluoromethoxyphenyl)-3-hexenyl bromide [V; Ar is 4-$F_3COC_6H_4$, R is H], or 6-(4-trifluoromethylphenyl)-3-hexenyl bromide [V; Ar is 4-$F_3CC_6H_4$, R is H].

The latter products can be hydrogenated according to the procedure of Preparation (C11) to give, respectively, 3 - isopropyl-6-(3,4-methylenedioxyphenyl)hexyl bromide [Va; Ar is 3,4-methylenedioxyphenyl, R is $(CH_3)_2CH$], 3-butyl-6-(3,4-methylenedioxyphenyl)hexyl bromide [Va; Ar is 3,4-methylenedioxyphenyl, R is $CH_3CH_2CH_2CH_2$], 6-(3,4-dichlorophenyl)hexyl bromide [Va; Ar is 3,4-$Cl_2C_6H_3$, R is H], 6-(2,4-dichlorophenyl)hexyl bromide [Va; Ar is 2,4-$Cl_2C_6H_3$, R is H], 6-(4-bromophenyl)hexyl bromide [Va; Ar is 4-$BrC_6H_4$, R is H], 6-(4-fluorophenyl)hexyl bromide [Va; Ar is 4-$FC_6H_4$, R is H], 6-(4-trifluoromethoxyphenyl)hexyl bromide [Va; Ar is 4-$F_3COC_6H_4$, R is H], or 6-(4-trifluoromethylphenyl)hexyl bromide [Va; Ar is 4-$F_3CC_6H_4$, R is H].

(D) Arylalkenyl iodides (VI, IX) and arylalkyl iodides (VIa)

(D1) 3 - Ethyl - 6 - (3,4 - methylenedioxyphenyl)-3-hexenyl iodide [VI; Ar is 3,4-methylenedioxyphenyl, R is $C_2H_5$].—A mixture of 23 g. of 3-ethyl-6-(3,4-methylenedioxyphenyl)-3-hexenyl bromide (Preparation (C1)) and 30 g. of powdered potassium iodide in 250 ml. of dimethylformamide was stirred for about sixteen hours. The reaction mixture was concentrated to remove the solvent and the residue partitioned between cyclohexane and water. The cyclohexane layer was separated, dried over anhydrous magnesium sulfate and evaporated to give 33.0 g. of 3-ethyl-6-(3,4-methylenedioxyphenyl) - 3 - hexenyl iodide as a light yellow oil.

(D2) 6 - (3,4-Methylenedioxyphenyl)-3-hexenyl iodide [VI; Ar is 3,4-methylenedioxyphenyl, R is H] was prepared from 12.9 g. of 6-(3,4-methylenedioxyphenyl)-3-hexenyl bromide (Preparation (C2)) and 7 g. of sodium iodide in 120 ml. of acetone, refluxed for three hours, affording 12.5 g. of product as an oil.

(D3) 3-Methyl-6-(3,4-methylenedioxyphenyl) - 3 - hexenyl iodide [VI; Ar is 3,4-methylenedioxyphenyl, R is $CH_3$] was prepared from 19.0 g. of 3-methyl-6-(3,4-methylenedioxyphenyl)-3-hexenyl bromide (Preparation (C3)) and 10.5 g. of sodium iodide in 125 ml. of acetone, to give 21 g. of product as a yellow oil.

(D4) 3-Ethyl-6-(3,4-dimethoxyphenyl) - 3 - hexenyl iodide [VI; Ar is 3,4-$(CH_3O)_2C_6H_3$, R is $C_2H_5$] was prepared from 13.8 g. of 3-ethyl-6-(3,4-dimethoxyphenyl)-3-hexenyl bromide (Preparation (C4)) and 9 g. of sodium iodide in 120 ml. of acetone, to give 15 g. of product as an oil.

(D5) 6-(4-Methoxyphenyl)-3-hexenyl iodide [VI; Ar is 4-$CH_3OC_6H_4$, R is H] was prepared from 24 g. of 6-(4-methoxyphenyl) - 3 - hexenyl bromide (Preparation (C5)) and 14.75 g. of sodium iodide in 475 ml. of 2-butanone, to give 28.5 g. of product as an oil.

(D6) 6-(4-Methoxyphenyl)hexyl iodide [VIa; Ar is 4-$CH_3OC_6H_4$, R is H] was prepared from 16.3 g. of 6-(4-methoxyphenyl)hexyl bromide (Preparation (C11)) and 9.93 g. of sodium iodide in 325 ml. of 2-butanone, to give 19.3 g. of product as a pale yellow oil.

(D7) 6-Phenylhexyl iodide [VIa; Ar is $C_6H_5$, R is H] was prepared from 16 g. of 6-phenylhexyl bromide (Preparation (C12)) and 10.95 g. of sodium iodide in 325 ml. of 2-butanone, to give 19.1 g. of product as an oil.

(D8) 6-(4-Chlorophenyl)hexyl iodide [VIa; Ar is 4-$ClC_6H_4$, R is H] was prepared from 17 g. of 6-(4-chlorophenyl)hexyl bromide (Preparation (C13)) and 10.2 g. of sodium iodide in 325 ml. of acetone, to give 21 g. of product as an oil.

(D9) 6-(p-Tolyl)hexyl iodide [VIa; Ar is 4-$CH_3C_6H_4$, R is H] can be prepared from 6-(p-tolyl)hexyl bromide (Preparation (C14)) and sodium iodide in acetone according to the procedure of Preparation (D2) above.

(D10) 3-Ethyl-6-(4-carbomethoxyphenyl)-3-hexenyl iodide [VI; Ar is 4-$CH_3O_2CC_6H_4$, R is $C_2H_5$] was prepared from 17.5 g. of 3 - ethyl - 6 - (4-carbomethoxyphenyl)-3-hexenyl bromide (Preparation (C9)) and 17.5 g. of sodium iodide in 200 ml. of acetone, to give 14 g. of product as an oil.

(D11) 3-Ethyl-6-(3,4-methylenedioxyphenyl)-3,5-hexadienyl iodide [IX; Ar is 3,4-methylenedioxyphenyl, R is $C_2H_5$] was prepared from 10 g. of 3-ethyl-6-(3,4-methylenedioxyphenyl) - 3,5 - hexadienyl bromide (Preparation (C10)) and 6 g. of sodium iodide in 120 ml. of acetone, to give 10.5 g. of product as an oil.

By similar procedures 3-isopropyl-6-(3,4-methylenedioxyphenyl)hexyl bromide, 3-butyl-6-(3,4-methylenedioxyphenyl) - hexyl bromide, 6-(3,4-dichlorophenyl)hexyl bromide, 6 - (2,4 - dichlorophenyl)hexyl bromide, 6 - (4-bromophenyl)hexyl bromide, 6 - (4 - fluorophenyl)hexyl bromide, 6-(4-trifluoromethoxyphenyl)hexyl bromide, or 6-(4-trifluoromethylphenyl)hexyl bromide can be caused to react with sodium iodide to give, respectively, 3-isopropyl - 6 - (3,4-methylenedioxyphenyl)hexyl iodide [VIa; Ar is 3,4-methylenedioxyphenyl, R is $(CH_3)_2CH$], 3-butyl - 6 - (3,4-methylenedioxyphenyl)hexyl iodide [VIa; Ar is 3,4-methylenedioxyphenol, R is $CH_3CH_2CH_2CH_2$], 6-(3,4-dichlorophenyl)hexyl iodide [VIa; Ar is 3,4-$Cl_2C_6H_3$, R is H], 6-(2,4-dichlorophenyl)hexyl iodide [VIa; Ar is 2,4-$Cl_2C_6H_3$, R is H], 6-(4-bromophenyl) hexyl iodide [VIa; Ar is 4-$BrC_6H_4$, R is H], 6-(4-fluorophenyl)hexyl iodide [VIa; Ar is 4-$FC_6H_4$, R is H], 6-(4-trifluoromethoxyphenyl) - hexyl iodide [VIa; Ar is 4-$F_3COC_6H_4$, R is H], or 6-(4-trifluoromethylphenyl) hexyl iodide [VIa; Ar is 4-$F_3CC_6H_4$, R is H].

Example 1

4 - [3-Ethyl-6-(3,4-methylenedioxyphenyl)-3-hexenyl]-3,5-heptanedione [I; Ar is 3,4-methylenedioxyphenyl, R° is H, R' and R" are $CH_3CH_2CO$, Y is

$C(C_2H_5)=CHCH_2CH_2$].—

A solution of 15 g. of the lithium salt of 3,5-heptanedione (prepared as described in Example 8 below) in 100 ml. of tetramethylurea was stirred under nitrogen at room temperature, and 10 g. of 3-ethyl-6-(3,4-methylenedioxyphenyl)-3-hexenyl iodide (Preparation (D1)) was added. The reaction mixture was stirred for forty-eight hours, then concentrated to remove the solvent, and the residue slurried in ether and treated with excess glacial acetic acid. Water was added, the ether layer separated, washed with water and concentrated. The residue was distilled in a molecular still to remove volatile material at 110° C. (0.001 mm.), and the non-volatile residue was chromatographed on 10 g. of activated magnesium silicate in benzene solution and eluted with ethyl acetate to give 4-[3-ethyl-6-(3,4 - methylenedioxyphenyl) - 3 - hexenyl]-3,5-heptanedione as a yellow oil.

The reaction was repeated starting with 38.4 g. of 3-ethyl-6-(3,4-methylenedioxyphenyl)-3-hexenyl iodide and the product was chromatographed twice on activated magnesium silicate. The second chromatogram was eluted with benzene to give 12.4 g. of 4-[3-ethyl-6-(3,4-methylenedioxyphenyl)-3-hexenyl]-3,5-heptanedione as a yellow oil.

Infrared (IR) (oil film) $\lambda_\mu^{max.}$ 283w, 2.95w; 3.39, 3.92s (CH); 5.80s, 5.90s (C=O); 6.27ms, 6.23m, 6.65s, 6.71s, 6.94s (aromatic+CH).

4-[3-Ethyl-6-(3,4 - methylenedioxyphenyl)-3-hexenyl]-3,5-heptanedione was found to have pesticidal activity when tested against yellow mealworm pupae (tenebrio) at a concentration of 0.1 microgram per insect, against dock beetle larvae at 1 microgram per insect, against yellow fever mosquito larvae at 15 p.p.m. in water and against *rhodnius prolixus* nymph at 100 micrograms per insect.

Example 2

3-[3-Ethyl-6-(3,4 - methylenedioxyphenyl)-3-hexenyl]-2,4-pentanedione [I; Ar is 3,4-methylenedioxyphenyl, R° is H, R' and R'' are $CH_3CO$, Y is $C(C_2H_5)=CHCH_2CH_2$].—

A mixture of 10 g. of the lithium salt of 2,4-pentanedione (prepared by treatment of 2,4-pentanedione in ether with n-butyllithium by the procedure described in Example 8 below) and 10 g. of 3-ethyl-6-(3,4-methylenedioxyphenyl)-3-hexenyl iodide (Preparation (D1)) in 100 ml. of tetramethylurea was heated at 60° C. for forty-eight hours. The reaction mixture was filtered, the filtrate concentrated *in vacuo* to a volume of about 20 ml., then diluted with 200 ml. of water and extracted with ether. The ether solution was washed with water and saturated sodium chloride solution, and dried over anhydrous magnesium sulfate. The dried ether solution was concentrated to remove the solvent, and the residue was chromatographed on silica gel. The chromatograph column was eluted with pentane containing 20% benzene which removed unreacted iodide, and then eluted with benzene containing 20% ether, affording 2.4 g. of 3-[3-ethyl-6-(3,4-methylenedioxyphenyl)-3-hexenyl]-2,4-pentanedione as an amber oil.

*Anal.*—Calcd. for $C_{20}H_{27}O_4$: C, 72.48; H, 8.21. Found: C, 72.34; H, 7.93.

IR (oil film) $\lambda_\mu^{max.}$ 3.45mss+shldrs. (CH); 5.80mss, 5.91s (C=O); 6.25m, 6.35m, 6.67mss, 6.73s, 6.96mss (arom+CH).

Nuclear magnetic resonance (NMR) [20% CDCl$_3$, internal tetramethylsilane (TMS)] δ p.p.m. (ratio) 6.63(3) (arom); 5.87(2) (O—CH$_2$—O); 5.08(1) (=CH); 3.53(1) [(O=C)$_2$CH]; 1.5–3.0(16) (aliphatic CH+COCH$_3$×2); 0.9(3) (Me triplet).

3-[3-Ethyl-6-(3,4 - methylenedioxyphenyl)-3-hexenyl]-2,4-pentanedione was found to be pesticidal against yellow mealworm pupae (tenebrio) at a concentration of 100 micrograms per insect, against dock beetle larvae at 20 micrograms per insect, against cabbage looper larvae at 100 micrograms per insect and against Rhodnius prolixus nymph at 30 micrograms per insect.

Example 3

3-[3-Ethyl-6-(3,4 - methylenedioxyphenyl)-3-hexenyl]-2,4-hexanedione [I; Ar is 3,4-methylenedioxyphenyl, R° is H, R' is $CH_3CO$, R'' is $CH_3CH_2CO$, Y is $(C_2H_5)=CHCH_2CH_2$]

was prepared from 23.2 g. of 3-ethyl-6-(3,4-methylenedioxyphenyl)-3-hexenyl iodide (Preparation (D1)) and 22.3 g. of the lithium salt of 2,4-hexanedione (prepared by the procedure described in Example 8 below) in 300 ml. of dimethylformamide according to the procedure described above in Example 2. There was thus obtained 21 g. of crude product which was chromatographed on 600 g. of silica gel in pentane solution containing 20% benzene. The column was eluted with the pentane-benzene-ether solvent series. Benzene containing 3% ether brought out the desired product, 14.5 g. of 3-[3-ethyl-6-(3,4-methylenedioxyphenyl)-3-hexenyl]-2,4-hexanedione as a yellow oil.

*Anal.*—Calcd. for $C_{21}H_{28}O_4$: C, 73.23; H, 8.19. Found: C, 73.52; H, 8.32.

IR (oil film) $\lambda_\mu^{max.}$ 3.45mss+shldrs. (CH); 5.83s, 5.91s (C=O); 6.33m, 6.74s+shldr., 6.96mss (arom and CH).

NMR (20% CDCl$_3$, internal TMS) δ p.p.m. (ratio) 6.70(3) (arom); 5.92(2) (O—CH$_2$—O); 5.13(1) (=CH); 362(1) [O=C)$_2$CH]; 1.7–2.9(15) aliph. CH, incl. COCH$_3$ singlet); 1.03(6) (Me triplet×2).

3-[3-Ethyl-6-(3,4 - methylenedioxyphenyl)-3-hexenyl]-2,4-hexanedione was found to be pesticidal against yellow mealworm pupae (tenebrio) at a concentration of 10 micrograms per insect, against dock beetle larvae at a concentration of 1 microgram per insect and against *Rhodnius prolixus* nymph at 10 micrograms per insect.

Example 4

Ethyl 2-acetyl-5-ethyl-8-(3,4-methylenedioxyphenyl)-5-octenoate [I; Ar is 3,4-methylenedioxyphenyl, R° is H, R' is $CH_3CO$, R'' is $COOC_2H_5$, Y is $C(C_2H_5)=CHCHCH_2$]

was prepared from 9.6 g. of 3-ethyl-6-(3,4-methylenedioxyphenyl)-3-hexenyl iodide (Preparation (D1)) and 10 g. of the lithium salt of ethyl acetoacetate (prepared by the method described in Example 8 below) in 100 ml. of tetramethylurea according to the procedure described above in Example 2. The reaction was allowed to proceed for five days at 60° C., and the resulting product was isolated and chromatographed on silica gel to give 4.9 g. of ethyl 2-acetyl-5-ethyl-8-(3,4-methylenedioxyphenyl)-5-octenoate as a yellow oil.

*Anal.*—Calcd. for $C_{20}H_{28}O_5$: C, 69.98; H, 7.83. Found: C, 69.97; H, 7.86.

IR (oil film) $\lambda_\mu^{max.}$ 3.45mss+shldrs. (CH), 5.78mss, 5.86s (C=O); 6.15–6.30m, 6.67mss, 6.73s, 6.95mss (arom and CH).

NMR (20% CDCl$_3$, internal TMS) δ p.p.m. (ratio) 6.63(3) (arom); 5.86(2) (O—CH$_2$—O); 5.10(1) (=CH); 4.17(2) (OCH$_2$ quartet); 3.33(1)

$[(O=C)_2$—CH];

1.7–2.8(13) (aliph. CH incl. COCH$_3$); 1.25(3), 0.90(3) (Me triplet×2).

Ethyl 2-acetyl-5-ethyl-8-(3,4-methylenedioxyphenyl)-5-octenoate was found to have a minimum inhibitory concentration *in vitro* of 6 micrograms per milliliter against equine rhino virus.

Example 5

Ethyl 2-propionyl-5-ethyl - 8 - (3,4 - methylenedioxyphenyl)-5-octenoate [I; Ar is 3,4-methylenedioxyphenyl, R° is H, R' is $CH_3CH_2CO$, R'' is $COOC_2H_5$, Y is $C(C_2H_5)=CHCH_2CH_2$]

was prepared from 10 g. of 3-ethyl-6-(3,4-methylenedioxyphenyl)-3-hexenyl iodide (Preparation (D1)) and 4.6 g. of the lithium salt of ethyl 3-oxovalerate (prepared by the method described in Example 8 below) in 100 ml. of dimethylformamide by the procedure described above in Example 2. The product was chromatographed on silica gel and eluted with chloroform containing 20% benzene to give 5.5 g. of ethyl 2-propionyl-5-ethyl-8-(3,4-methylenedioxyphenyl)-5-octenoate as an amber liquid.

*Anal.*—Calcd. for $C_{22}H_{30}O_5$: C, 70.56; H, 8.08. Found: C, 71.70, 71.60; H, 8.06, 8.09.

Ethyl 2-propionyl-5-ethyl-8 - (3,4 - methylenedioxyphenyl)-5-octenoate was found to have a minimum inhibitory concentration *in vitro* of 12 micrograms per milliliter against equine rhino virus.

Ethyl 2-propionyl-5-ethyl-8 - (3,4 - methylenedioxyphenyl)-5-octenoate was found to be pesticidal against yellow mealworm pupae (tenebrio) at a concentration of 10 micrograms per insect.

Example 6

Ethyl 2-butyryl-5-ethyl-8-(3,4-methylenedioxyphenyl)-5-octenoate [I; Ar is 3,4-methylenedioxyphenyl, R° is H, R' is CH₃CH₂CH₂CO, R" is COOC₂H₅, Y is $$C(C_2H_5)=CHCH_2CH_2]$$

was prepared from 20 g. of 3-ethyl-6-(3,4-methylendioxyphenyl)-3-hexenyl iodide (Preparation (D1)) and 12 g. of the lithium salt of ethyl 3-oxohexanoate (prepared by the method described below in Example 8) according to the procedrue described above in Example 2. There was thus obtained 11.57 g. of ethyl 2-butyryl-5-ethyl-8-(3,4-methylenedioxyphenyl)-5-octenoate as a light yellow oil.

*Anal.*—Calcd. for $C_{23}H_{32}O_5$: C, 71.11; H, 8.30. Found: C, 70.89; H, 8.54.

IR (oil film) $\lambda_\mu^{max.}$ 3.45mss+shldrs. (CH); 5.78mss, 5.91s (C=O); 6.24m, 6.74mss, 6.88 shldr., 6.96mss (arom and CH).

NMR (20% CDCl₃, internal TMS) δ p.p.m. (ratio) 6.73(3) (arom); 5.93(2) (O—CH₂—O); 5.17(1) (=CH); 4.22(2) (OCH₂CH₃ quartet); 3.42(1+)

$$[(O=C)_2CH],$$

0.7–2.8(23) (aliph. CH incl. Me triplet×3).

Ethyl 2-butyryl-5-ethyl-8-(3,4-methylenedioxyphenyl)-5-octenoate was found to have a minimum inhibitory concentration *in vitro* of 12 micrograms per milliliter against equine rhino virus.

Ethyl 2-butyryl-5-ethyl-8-(3,4-methylenedioxyphenyl)-5-octenoate was found to be pesticidal against yellow mealworm pupae (tenebrio) at a concentration of 0.3 micrograms per insect and against dock beetle larvae at a concentration of 5 micrograms per insect.

Example 7

4-[6-(3,4-Methylenedioxyphenyl)-3-hexenyl]-3,5 - heptanedione [I; Ar is 3,4-methylenedioxyphenyl, R° is H, R' and R" are CH₃CH₂CO, Y is $$C(C_2H_5)=CHCH_2CH_2]$$

was prepared from 12.5 g. of 6-(3,4-methylenedioxyphenyl)-3-hexenyl iodide (Preparation (D2)) and 12.5 g. of the lithium salt of 3,5-heptanedione in 175 ml. of dimethylformamide. The product was chromatographed on silica gel and eluted with pentane-benzene (1:1) and then with chloroformbenzene (7:3). The latter brought out 7.0 g. of 4-[6-(3,4-methylenedioxyphenyl)-3-hexenyl] - 3,5-heptanedione as a light amber oil.

*Anal.*—Calcd. for $C_{20}H_{26}O_4$: C, 72.70; H, 7.53. Found: C, 72.48; H, 7.96.

IR (oil film) $\lambda_\mu^{max.}$ 3.45mss+shldrs. (CH), 5.81mss, 5.91s (C=O); 6.25–6.35m, 6.67mss, 6.74s, 6.95mss (arom and CH).

NMR (20% CDCl₃, internal TMS) δ p.p.m. (ratio) 6.62(3) (arom); 5.85(2) (O—CH₂—O); 5.35(2) (=CH×2), 3.58(1) [(O=C)₂CH]; 1.7–2.8(12) (aliph. CH); 1.00(6) (Me triplet×2).

4-[6-(3,4-Methylenedioxyphenyl)-3-hexenyl]-3,5 - heptanedione was found to have a minimum inhibitory concentration in vitro of 3–6 micrograms per milliliter against equine rhino virous.

4-[6-(3,4-Methylenedioxyphenyl)-3-hexenyl]-3,5 - heptanedione was found to be pesticidal against yellow mealworm pupae (tenebrio) at a concentration of 100 micrograms per insect and against dock bettle larvae at 20 micrograms per insect.

Example 8

4-[3-Methyl-6-(3,4-methylenedioxyphenyl)-3-hexenyl]-3,5-heptanedione [I; Ar is 3,4-methylenedioxyphenyl, R° is H, R' and R" are CH₃CH₂CO, Y is $$C(CH_3)=CHCH_2CH_2].—$$

To 40 g. of 3,5-heptanedione in 400 ml. of ether at 0° C. was added dropwise 19.9 g. of n-butyllithium in hexane solution. The mixture was warmed to 25° C., filtered and the solid product washed with ether and dried.

The resulting lithium salt of 3,5-heptanedione (20 g.), 20.6 g. of 3-methyl-6-(3,4-methylenedioxyphenyl)-3-hexenyl iodide (Preparation (D3)) and 200 ml. of dimethylformamide was stirred at 50° C. for twenty-four hours. Additional dimethylformamide (50 ml.) was then added and the mixture stirred at 60° C. for sixty-five hours. The solution was concentrated *in vacuo* and the residue triturated with ether several times. The ether solution was washed with water, dried over anhydrous magnesium sulfate and concentrated to give 18 g. of an oil which was chromatographed on 500 g. of silica gel, applied in pentane. The column was eluted with the pentane-benzene-ether solvent sequence. The desired product was brought out by benzene containing 3% ether, affording 10.2 g. of 4-[3-methyl-6-(3,4-methylenedioxyphenyl)-3-hexenyl]-3,5-heptanedione as a light yellow viscous oil.

*Anal.*—Calcd. for $C_{21}H_{28}O_4$: C, 73.23; H. 19. Found: C, 73.44; H, 8.34.

IR (oil film) $\lambda_\mu^{max.}$ 3.45mss+shldrs. (CH); 5.82mss, 5.92s (C=O); 6.26m, 6.35m, 6.68mss, 6.74s, 6.96mss +shldrs. (arom and CH).

NMR (20% CDCl₃, internal TMS) δ p.p.m. (ratio) 6.63(3) (arom CH); 5.87(2) (O—CH₂—O); 5.12(1) (=CH); 3.57(1) [(O=C)₂CH]; 1.4–2.8(15) (aliph. CH); 1.00(3) (Me triplet×2).

4-[3 - Methyl - 6 - (3,4-methylenedioxyphenyl)-3-hexenyl]-3,5-heptanedione was found to have minimum inhibitory concentrations *in vitro* against rhino-2, equine rhino, para-influenza and resp. syn. virus of 3, 6, 6 and 6 micrograms per milliliter, respectively.

4-[3 - Methyl - 6 -(3,4-methylenedioxyphenyl)-3-hexenyl]-3,5-heptanedione was found to be pesticidal against yellow mealworm pupae (tenebrio) at a concentration of 3 microgram per insect, against dock beetle larvae at 5 micrograms per insect and against yellow fever mosquito larvae at 6.6 p.p.m. in water.

Example 9

4-[3 - Ethyl - 6 - (3,4 - methylenedioxyphenyl)hexyl]-3,5-heptanedione [I; Ar is 3,4-methylenedioxyphenyl, R° is H, R' and R" are CH₃CH₂CO, Y is $$CH(C_2H_5)CH_2CH_2CH_2].—$$

A mixture of 2.1 g. of 4-[3-ethyl-6-(3,4-methylenedioxyphenyl)-3-hexenyl]-3,5-heptanedione (Example 1) and 10.2 g. of palladium-on-carbon catalyst in 50 ml. of absolute ethanol was hydrogenated for two and one-half hours. The reaction mixture was filtered and concentrated to remove the solvent. The residue was chromatographed on 75 g. of silica gel in benzene-pentane (1:1). The column was eluted with the pentane-benzene-ether solvent sequence, and benzene containing 1% ether brought out the desired product, affording 2.1 g. of 4-[3-ethyl - 6 - (3,4 - methylenedioxyphenyl)hexyl]-3,5-heptanedione as a colorless oil.

*Anal.*—Calcd. for $C_{22}H_{32}O_4$: C, 73.20; H, 8.95. Found: 73.20, 73.07; H, 9.00, 8.82.

IR (oil film) $\lambda_\mu^{max.}$ 3.44s+shldrs. (CH), 5.80s, 5.90s (C=O), 6.24m, 6.73s, 6.66 shldr., 6.94s, 6.82 shldr. (arom and CH).

NMR (5% CDCl₃, internal TMS) δ p.p.m. (ratio) 6.3–6.8(3) (arom); 5.86(2) (O—CH₂—O); 3.56(1) [(O=C)₂CH triplet]; 0.7–2.7(30) (CH₂×8, (Me triplet×3).

4-[3-Ethyl-6-(3,4 - methylenedioxyphenyl)hexyl]-3,5-heptanedione was found to have a minimum inhibitory concentration *in vitro* against rhino-2, equine rhino, para-influenza and resp. syn. virus of 3-micrograms per milliliter.

4-[3 - Ethyl-6-(3,4 - methylenedioxyphenyl)hexyl]-3,5-heptanedione was found to be pesticidal against yellow mealworm pupae (tenebrio) at a concentration of 0.3 micrograms per insect.

Example 10

4-[6 - (3,4 - Methylenedioxyphenyl)hexyl] - 3,5-heptanedione [I; Ar is 3,4-methylenedioxyphenyl, R° is H, R' and R'' are CH$_3$CH$_2$CO, Y is CH$_2$CH$_2$CH$_2$CH$_2$] was prepared by hydrogenation of 29 g. of 4-[6-(3,4 - methylenedioxyphenyl) - 3 - hexenyl]-3,5-heptanedione (Example 7) according to the procedure described above in Example 9. There was thus obtained 17.2 g. of 4-[6-(3,4 - methylenedioxyphenyl) - hexyl]-3,5-heptanedione as a light yellow oil, b.p. 178–185° C. (0.002 mm.).

Anal.—Calcd. for C$_{20}$H$_{28}$O$_4$: C, 72.26; H, 8.49. Found: C, 72.24; H, 8.50.

IR (oil film) λ$_\mu$$^{max.}$ 3.45s, 3.53 shldr., 3.64 shldr. (CH); 5.82s, 5.92s (C=O); 6.26m, 6.35m (arom ring), 6.67s, 6.74s, 6.87 shldr. (CH).

NMR (20% CDCl$_3$, internal TMS) δ p.p.m. (ratio) 6.63(3) (arom CH); 5.87(2) (O—CH$_2$—O); 3.61(1) [(O=C)$_2$CH-triplet] 2.2–2.7(6) (CHCH$_2$×2, arom ring-CH$_2$); 0.85–2.2(16) (CH, incl. Me triplet×2).

4 - [6 - (3,4 - Methylenedioxyphenyl)hexyl]3,5-heptanedione was found to have a minimum inhibitory concentration in vitro of 3 micrograms per milliliter against equine rhino virus.

Example 11

4-[6 - (3,4 - Dimethoxyphenyl)-3-ethyl-3-hexenyl]-3,5-heptanedione [I; Ar is 3,4-(CH$_3$O)$_2$C$_6$H$_3$, R° is H, R' and R'' are CH$_3$CH$_2$CO, Y is C(C$_2$H$_5$)=CHCH$_2$CH$_2$] was prepared from 10 g. of 3-ethyl-6-(3,4-dimethoxyphenyl)-3-hexenyl iodide (Preparation (D4)) and 10 g. of the lithium salt of 3,5-heptanedione in 120 ml. of dimethylformamide according to the procedure described above in Example 2, affording 6 g. of 4-[6-(3,4-dimethoxyphenyl)-3-ethyl - 3 - hexenyl]-3,5-heptanedione as an amber oil.

Anal.—Calcd. for C$_{23}$H$_{34}$O$_4$: C, 73.76; H, 9.15. Found: C, 73.72; H, 9.06.

4-[6 - (3,4 - Dimethoxyphenyl)-3-ethyl-3-hexenyl]-3,5-heptanedione was found to be pesticidal against yellow mealworm pupae (tenebrio) at a concentration of 10 micrograms per insect and against dock beetle larvae at a concentration of 20 micrograms per insect.

Example 12

4-[6-(4-Methoxyphenyl)-3-hexenyl] - 3,5-heptanedione [I; Ar is 4-CH$_3$OC$_6$H$_4$, R° is H, R' and R'' are

CH$_3$CH$_2$CO,

Y is CH=CHCH$_2$CH$_2$] was prepared from 28.2 g. of 6-(4-methoxyphenyl)-3 - hexenyl iodine (Preparation (D5)) and 19 g. of the lithium salt of 3,5-heptanedione in 250 ml. of dimethylformamide according to the procedure described in Example 2, affording 19 g. of 4-[6-(4-methoxyphenyl)-3-hexenyl]-3,5-heptanedione as a pale yellow oil, b.p. 162–167° C. (0.04 mm.).

Anal.—Calcd. for C$_{20}$H$_{28}$O$_3$: C, 75.89; H, 8.91. Found: C, 75.92; H, 8.95.

IR (oil film) λ$_\mu$$^{max.}$ 3.37–3.53s (CH); 5.81s, 5.88s (C=O); 6.22m, 6.33ms, 6.62s (arom ring); 6.80–6.95ms (CH).

NMR (20% CDCl$_3$, internal TMS) δ p.p.m. (ratio) 6.67–7.2(4) (arom); 5.35(2) (=CH×2); 3.73, 3.58(4), [OCH$_3$, (O=C)$_2$—CH triplet]; 1.7–2.9(12) (other aliph. CH); 1.00(6) (Me triplet×2).

4-[6-(4-Methoxyphenyl) - 3 - hexenyl]-3,5-heptanedione was found to have a minimum inhibitory concentration in vitro of 3 micrograms per milliliter against equine rhino virus.

Example 13

4-[6-(4-Methoxyphenyl)hexyl] - 3,5-heptanedione [I; Ar is 4-CH$_3$OC$_6$H$_4$, R° is H, R' and R'' are CH$_3$CH$_2$CO, Y is CH$_2$CH$_2$CH$_2$CH$_2$] was prepared from 19.1 g. of 6-(4-methoxyphenyl)hexyl iodide (Preparation (D6)) and 12.8 g. of the lithium salt of 3,5-heptanedione in 175 ml. of dimethylformamide, affording 12.5 g. of 4-[6-4-methoxyphenyl)hexyl]-3,5 - heptanedione as a pale yellow oil, b.p. 162–163° C. (0.03 mm.).

Anal.—Calcd. for C$_{20}$H$_{30}$O$_3$: C, 75.43; H, 9.50. Found: C, 75.67; H, 9.67.

IR (oil film) λ$_\mu$$^{max.}$ 3.45s, 3.53ms (CH); 5.81mss, 5.91s (C=O); 6.23m, 6.34m, 6.63vs (arom ring); 6.8ms (CH).

NMR (20% CDCl$_3$, internal TMS) δ p.p.m. (ratio) 6.65–7.25(4) (arom); 3.73(3) (OCH$_3$); 3.62(1) [(O=C)$_2$H triplet]; 2.2–2.7(6) (COCH$_2$×2, CH$_2$-arom); 2.2–.7(16) (other aliph. CH incl. Me triplets).

4-[6-(4-Methoxyphenyl)hexyl] - 3,5-heptanedione was found to have a minimum inhibitory concentration in vitro of 3 micrograms per milliliter against equine rhino virus.

Example 14

4-(6-Phenylhexyl)-3,5-heptanedione [I; Ar is C$_6$H$_5$, R° is H, R' and R'' are CH$_3$CH$_2$CO, L is CH$_2$CH$_2$CH$_2$CH$_2$] was prepared from 19.1 g. of 6-phenylhexyl iodide (Preparation (D7)) and 14.1 g. of the lithium salt of 3,5-heptanedione in 195 ml. of dimethylformamide, affording 11.3 g. of 4-(6-phenylhexyl)-3,5-heptanedione as a pale yellow oil, b.p. 135–136° C. (0.03 mm.).

Anal.—Calcd. for C$_{19}$H$_{28}$O$_2$: C, 79.12; H, 9.78. Found: C, 79.49; H, 9.81.

IR (oil film) λ$_\mu$$^{max.}$ 3.45s, 3.34, 3.40, 3.52 shldrs. (CH); 5.81mss, 5.91s (C=O); 6.26m, 6.33m, 6.69m (arom ring); 6.88ms (CH).

NMR (20% CDCl$_3$, internal TMS) δ p.p.m. (ratio) 7.15(5) (phenyl); 3.60(1) [(O=C)$_2$CH triplet]; 2.1–2.8(6) (C=O—CH$_2$×2, arom-CH$_2$); 1.8–2.1(16) (aliph. CH incl. Me triplet×2).

4-(6-Phenylhexyl)-3,5-heptanedione was found to have a minimum inhibitory concentration in vitro of 6 micrograms per milliliter against equine rhino virus.

Example 15

4-[6-(4-Chlorophenyl)hexyl] - 3,5-heptanedione [I; Ar is 4-ClC$_6$H$_4$, R° is H, R' and R'' are CH$_3$CH$_2$CO, Y is CH$_2$CH$_2$CH$_2$CH$_2$] was prepared from 21 g. of 6-(4-chlorophenyl)hexyl iodide (Preparation (D8)) and 13.9 g. of the lithium salt of 3,5-heptanedione in 190 ml. of dimethylformamide, affording 13.5 g. of 4-[6-(4-chlorophenyl)hexyl]-3,5-heptanedione as a pale yellow oil, b.p. 159–160° C. (0.03 mm.).

Anal.—Calcd. for C$_{19}$H$_{27}$ClO$_2$: C, 70.68; H, 8.43. Found: C, 70.86; H, 8.49.

IR (oil film) λ$_\mu$$^{max.}$ 3.44s, 3.38, 3.52 shldrs. (CH); 5.81mss, 5.90s (C=O); 6.38m, 6.71s (arom ring); 6.86ms, 6.93 shldr. (CH).

NMR (20% CDCl$_3$, internal TMS) δ p.p.m. (ratio) 6.8–7.3(4) (arom); 3.62(1) [(O=C)$_2$CH triplet]; 2.2–2.7(6) (CO—CH$_2$×2, arom-CH$_2$); 0.8–2.0(16) (other aliph. CH incl. Me triplet×2).

4-[6-(4-Chlorophenyl)hexyl]-3,5 - heptanedione was found to have a minimum inhibitory concentration in vitro of 1.5 micrograms per milliliter against equine rhino virus.

4-[6-(4-Chlorophenyl)hexyl] - 3,5-heptanedione can also be prepared by heating 6-(4-chlorophenyl) hexyl bromide (Preparation (C13)) with the lithium salt of 3,5-heptanedione in dimethylformamide at 100 ° C.

Example 16

4-[6-(p-Tolyl) hexyl] - 3,5 heptanedione [I; Ar is 4-CH$_3$C$_6$H$_4$, R° is H, R' and R'' are CH$_3$CH$_2$CO, Y is CH$_2$CH$_2$CH$_2$CH$_2$] can be prepared from 6-(p-tolyl) hexyl iodide (Preparation (D9)) and the lithium salt of 3,5-heptanedione according to the procedure of Example 8.

Example 17

4-[3-Ethyl - 6 - (4-carbomethoxyphenyl)-3-hexenyl]-3,5-heptanedione [I; Ar is 4-CH$_3$O$_2$CC$_6$H$_4$, R° is H, R' and R'' are CH$_3$CH$_2$CO, Y is C(C$_2$H$_5$)=CHCH$_2$CH$_2$]

was prepared from 14 g. of 3-ethyl-6-(4-carbomethoxyphenyl)-3-hexenyl iodide (Preparation (D10)) and 14 g. of the lithium salt of 3,5-heptanedione and 200 ml. of dimethylformamide according to the procedure described above in Example 2. The product was chromatographed on silica gel and eluted with the pentane-benzene-ether solvent series. Benzene containing 2% ether brought out the desired product, 2.6 g. of 4-[3-ethyl-6-(4-carbomethoxyphenyl)-3-hexenyl]-3,5-heptanedione as a yellow oil.

*Anal.*—Calcd. for $C_{23}H_{32}O_4$: C, 74.16; H, 8.66. Found: C, 74.14, 74.41; H, 8.53, 8.69.

IR (oil film) $\lambda_\mu^{max.}$ 3.44*mss*+shldrs. (CH); 5.77*s*, 5.90 shldr. (C=O); 6.24*mms*, 6.35*m*, 6.63*w*; 6.87*mms*, 6.98 *ms* (arom+CH).

NMR (20% $CDCl_3$, internal TMS) $\delta$ p.p.m. (ratio) 8.00(2), 7.25(2) (arom); 5.10(1+) (=CH); 3.88(3) (OMe); 3.61(1) [O=C) CH], 0.7–3.0(22) (aliph. CH incl. Me triplets).

4 - [3-Ethyl-6-(4-carbomethoxyphenyl) - 3 - hexenyl]-3,5-heptanedione was found to have a minimum inhibitory concentration *in vitro* of 25 micrograms per milliliter against equine rhino virus.

4 - [3-Ethyl-6-(4-carbomethoxyphenyl) - 3 - hexenyl]-3,5 - heptanedione was found to be pesticidal against dock beetle larvae at a concentration of 1 microgram per insect.

Example 18

4-[3-Ethyl-6-(3,4-methylenedioxyphenyl) - 3,5 - hexadienyl] - 3,5 - heptanedione [I; Ar is 3,4-methylenedioxyphenyl, R° is H, R' and R" are $CH_3CH_2CO$, Y is $C(C_2H_5)$=CHCH=CH] was prepared from 10.5 g. of 3-ethyl - 6 - (3,4-methylenedioxyphenyl)-3,5-hexadienyl iodide (Preparation (D11)) and 10 g. of the lithium salt of 3,5-heptanedione in 170 ml. of dimethylformamide. The product was chromatographed on silica gel and the impurities removed by elution with pentane-benzene (1:1). The desired product was brought out by elution with chloroform-benzene (6:4), affording 2 g. of 4- [3-ethyl - 6 - (3,4-methylenedioxyphenyl)-3,5-hexadienyl] - 3,5 - heptanedione as an amber oil.

*Anal.*—Calcd. for $C_{22}H_{28}O_4$: C, 74.13; H, 7.92. Found: C, 74.26; H, 7.91.

4 - [3-Ethyl-6-(3,4-methylenedioxyphenyl) - 3,5 - hexadienyl]-3,5-heptanedione was found to have a minimum inhibitory concentration *in vitro* of 6 micrograms per milliliter against equine rhino virus.

4 - [3-Ethyl-6-(3,4-methylenedioxyphenyl) - 3,5 - hexadienyl]-3,5-heptanedione was found to be pesticidal against yellow mealworm pupae (tenebrio) at a concentration of 10 micrograms per insect and against dock beetle larvae at a concentration of 20 micrograms per insect.

By procedures similar to those described above 3-isopropyl-6-(3,4-methylenedioxyphenyl)hexyl iodide, 3-butyl-6-(3,4-methylenedioxyphenyl)hexyl iodide, 6-(3,4-dichlorophenyl)-hexyl iodide, 6-(2,4-dichlorophenyl)hexyl iodide, 6-(4-bromophenyl)hexyl iodide, 6-(4-fluorophenyl)hexyl iodide, 6-(4-trifluoromethoxyphenyl)hexyl iodide, or 6-(4-trifluoromethylphenyl)hexyl iodide can be caused to react with the lithium salt of 3,5-heptanedione to give, respectively, 4-[3-isopropyl - 6 - (3,4-methylenedioxyphenyl) hexyl]-3,5-heptanedione [I; Ar is 3,4-methylenedioxyphenyl, R° is H, R' and R" are $CH_3CH_2CO$, Y is $$CH(C_3H_7)CH_2CH_2CH_2],$$

4 - [3-butyl - 6 - (3,4-methylenedioxyphenyl)hexyl]-3,5-heptanedione [I; Ar is 3,4-methylenedioxyphenyl, R° is H, R' and R" are $CH_3CH_2CO$, Y is $$CH(C_4H_9)CH_2CH_2CH_2],$$

4 - [6-(3,4 - dichlorophenyl)hexyl]3,5-heptanedione [I; Ar is 3,4-$Cl_2C_6H_3$, R° is H, R' and R" are $CH_3CH_2CO$, Y is $CH_2CH_2CH_2CH_2$], 4-[6-(2,4-dichlorophenyl)hexyl]-3,5-heptanedione [I; Ar is 2,4-$Cl_2C_6H_3$, R° is H, R' and R" are $CH_3CH_2CO$, Y is $CH_2CH_2CH_2CH_2$], 4-[6-(4-bromophenyl)hexyl]-3,5-heptanedione [I; Ar is 4-$BrC_6H_4$, R° is H, R' and R" are $CH_3CH_2CO$, Y is $$CH_2CH_2CH_2CH_2],$$

4-[6-(4-fluorophenyl)hexyl] - 3,5 - heptanedione [I; Ar is 4-$FC_6H_4$, R° is H, R' and R" are $CH_3CH_2CO$, Y is $CH_2CH_2CH_2CH_2$], 4 - [6-(4-trifluoromethoxyphenyl)hexyl]-3,5-heptanedione [I; Ar is 4-$F_3COC_6H_4$, R° is H, R' and R" are $CH_3CH_2CO$, Y is $CH_2CH_2CH_2CH_2$], or 4-[6-(4-trifluoromethylphenyl)hexyl] - 3,5 - heptanedione [I; Ar is 4-$F_3CC_6H_4$, R° is H, R' and R" are $CH_3CH_2CO$, Y is $CH_2CH_2CH_2CH_2$].

Example 19

4-Chloro - 4 - [3-ethyl-6-(3,4-methylenedioxyphenyl)-3-hexenyl]-3,5-heptanedione [I; Ar is 3,4-methylenedioxyphenyl, R° is Cl, R' and R" are $CH_3CH_2CO$, Y is $$C(C_2H_5)=CHCH_2CH_2].—$$

A solution of 3.1 g. (0.193 mole) of cupric chloride dihydrate and 1.5 g. of lithium chloride in 60 ml. of dimethylformamide was warmed to 90° C. and 6.0 g. (0.0167 mole) of 4-[3-ethyl-6-(3,4-methylenedioxyphenyl)-3-hexenyl]-3,5-heptanedione (Example 1) was added. The reaction mixture was stirred at 90° C. for two hours, then cooled and concentrated *in vacuo* to remove the solvent. The residual oil which still contained some starting material was treated again with 2.47 g. of cupric chloride and 1.2 g. of lithium chloride in 40 ml. of dimethylformamide, two hours at 90° C. The product was isolated and chromatographed on 150 g. of silica gel in 50% benzene-pentane. The column was eluted with the same solvent and then with pentane containing increasing proportions of benzene. The desired product was brought out with 65–75% benzene to give 2.95 g. of 4-chloro-4-[3-ethyl-6-(3,4-methylenedioxyphenyl)-3-hexenyl]-3,5-heptanedione as a light yellow liquid.

*Anal.*—Calcd. for $C_{22}H_{29}ClO_4$: C, 67.25; H, 7.44; Cl, 9.02. Found: C, 67.38; H, 7.56; Cl, 9.06.

IR (oil film) $\lambda_\mu^{max.}$ 3.40, 3.45*mss*, 3.49 shldr. (CH); 5.79*mss*, 5.88*s* (C=O); 6.27*m*, 6.67*mss* (arom); 6.73*s*, 6.95*mss* (CH).

NMR (20% $CDCl_3$, internal TMS) $\delta$ p.p.m. (ratio) 6.63(3) (arom); 5.87(2) (O—$CH_2$—O); 5.15(1) (=CH—); 1.67–2.92(14) ($CH_2\times7$), 0.7–1.5(9) (Me triplet$\times3$).

4-Chloro-4-[3-ethyl - 6 - (3,4-methylenedioxyphenyl)-3-hexenyl]-3,5-heptanedione was found to have minimum inhibitory concentrations *in vitro* against rhino-2, para-influenza and resp. syn. virus of 1.25, 12 and 12 micrograms per milliliter, respectively.

4-Chloro - 4 - [3-ethyl-6-(3,4-methylenedioxyphenyl)-3-hexenyl]-3,5-heptanedione was found to be pesticidal against yellow mealworm pupae (tenebrio) at a concentration of 0.3 micrograms per insect and against dock beetle larvae at 5 micrograms per insect.

Example 20

4-Methyl-4-[3-ethyl - 6 - (3,4-methylenedioxyphenyl)-3-hexenyl]-3,5-heptanedione [I; Ar is 3,4-methylenedioxyphenyl, R° is $CH_3$, R' and R" are $CH_3CH_2CO$, Y is $C(C_2H_5)$=$CHCH_2CH_2$].—A solution of 6.4 g. (0.042 mole) of 1,5-diazabicyclo-[5.4.0]undec-5-ene and 5.0 g. (0.014 mole) of 4-[3-ethyl - 6 - (3,4-methylenedioxyphenyl)-3-hexenyl]-3,5-heptanedione (Example 1) in 50 ml. of absolute ethanol was stirred on an oil bath at 45–50° C. Methyl iodide (4.0 g., 0.028 mole) in 10 ml. of ethanol was added dropwise over a twenty minute period. During three hours, four additional equivalents of 1,5-diazabicyclo[5.4.0]undec - 5 - ene and five more equivalents of methyl iodide were added alternately. The mixture was added to 400 ml. of ether, and the ether was extracted with water, dried over anhydrous magnesium sulfate and concentrated. The residue which still contained some starting material was again treated with three equivalents of 1,5-diazabicyclo[5.4.0]undec-5-ene and one equivalent of methyl iodide in ethanol. After the reaction was complete, the product was isolated and chromatographed on silica gel (3.75 g.) using 75% benzene in pentane. The product was eluted with 75% benzene and then with pure benzene; the latter benzene fractions brought out the desired product, affording 1.5 g. of 4-methyl-4-[3-ethyl-6-(3,4 - methylenedioxyphenyl)-3-hexenyl]-3,5-heptanedione as a light yellow oil.

*Anal.*—Calcd. for $C_{23}H_{32}O_4$: C, 74.16; H, 8.66. Found: C, 74.62, 74.85; H, 8.71, 8.50.

IR (oil film) $\lambda_\mu^{max.}$ 3.39, 3.42s, 3.48, 3.61 shldrs. (CH); 5.89s, 5.82 shldr. (C=O); 6.22m, 6.65mss, 6.71s, 6.85mss, 6.93s (arom and CH).

NMR (20% $CLCl_3$, internal TMS) $\delta$ p.p.m. (ratio) 6.75(3) (arom); 5.97(2) (O—$CH_2$—O); 5.22(1) (=CH); 1.7–2.9(14) ($CH_2 \times 7$); 2.18(3) (Me singlet); 0.7–1.2(9) (Me triplet $\times 3$).

4-Methyl-4-[3-ethyl - 6 - (3,4-methylenedioxyphenyl)-3-hexenyl]-3,5-heptanedione was found to have minimum inhibitory concentrations *in vitro* against rhino-2, equine rhino, para-influenza and resp. syn. virus of 0.6, 1.5, 6 and 6 micrograms per milliliter, respectively.

4-Methyl-4-[3-ethyl - 6 - (3,4-methylenedioxyphenyl)-3-hexenyl]-3,5-heptanedione was found to be pesticidal against yellow mealworm pupae (tenebrio) at a concentration of 10 micrograms per insect.

By replacing the methyl iodide in the foregoing preparation by isopropyl iodide or n-butyl iodide there can be obtained, respectively, 4-isopropyl - 4 - [3-ethyl-6-(3,4-methylenedioxyphenyl) - 3 - hexenyl] - 3,5-heptanedione [I; Ar is 3,4-methylenedioxyphenyl, R° is $(CH_3)_2CH$, R' and R" are $CH_3CH_2CO$, Y is $C(C_2H_5)=CHCH_2CH_2$], or 4-(n-butyl) - 4 - [3-ethyl - 6 - (3,4-methylenedioxyphenyl)-3-hexenyl]-3,5-heptanedione [I; Ar is 3,4-methylenedioxyphenyl, R° is $CH_3CH_2CH_2CH_2$, R' and R" are $CH_3CH_2CO$, Y is $C(C_2H_5)=CHCH_2CH_2$].

I claim:

1. A compound of the formula

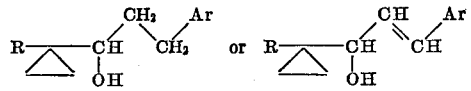

wherein R is hydrogen or lower-alkyl of 1 to 4 carbon atoms, and Ar is carboxyphenyl.

2. 2-(4-Carboxyphenyl)vinyl 1-ethylcyclopropyl carbinol, according to Claim 1.

3. 2-(4-Carboxyphenyl)ethyl 1-ethylcyclopropyl carbinol, according to Claim 1.

References Cited
UNITED STATES PATENTS 3,553,226   1/1971   Kaiser et al. _____ 260—520

DONALD G. DAUS, Primary Examiner

J. H. TURNIPSEED, Assistant Examiner

U.S. Cl. X.R.

260—340.5, 521 R, 515 P, 592, 618, 650 R, 668 R; 424—282, 308

UNITED STATES PATENT OFFICE
CERTIFICATE OF CORRECTION

Patent No. 3,829,475      Dated August 13, 1974

Inventor(s) Joseph C. Collins

It is certified that error appears in the above-identified patent and that said Letters Patent are hereby corrected as shown below:

Column 1, insert "I" under formula at lines 22-25; line 27, "Y in" should read --Y is--; formula at line 32 should read -- $-\overset{R}{\underset{|}{CH}}-CH_2CH_2CH_2-$ --.

Column 2, line 69, "meallo" should read --metallo--.

Signed and sealed this 19th day of November 1974.

(SEAL)
Attest:

McCOY M. GIBSON JR.
Attesting Officer

C. MARSHALL DANN
Commissioner of Patents